Dec. 18, 1962   J. O. McCAHON   3,068,501
APPARATUS FOR ASSEMBLING COMPONENTS OF CASES FOR BOOKS
Filed June 19, 1961   5 Sheets-Sheet 1

INVENTOR
JOHN O. McCAHON
BY
ATTORNEYS

Dec. 18, 1962    J. O. McCAHON    3,068,501
APPARATUS FOR ASSEMBLING COMPONENTS OF CASES FOR BOOKS
Filed June 19, 1961    5 Sheets-Sheet 3
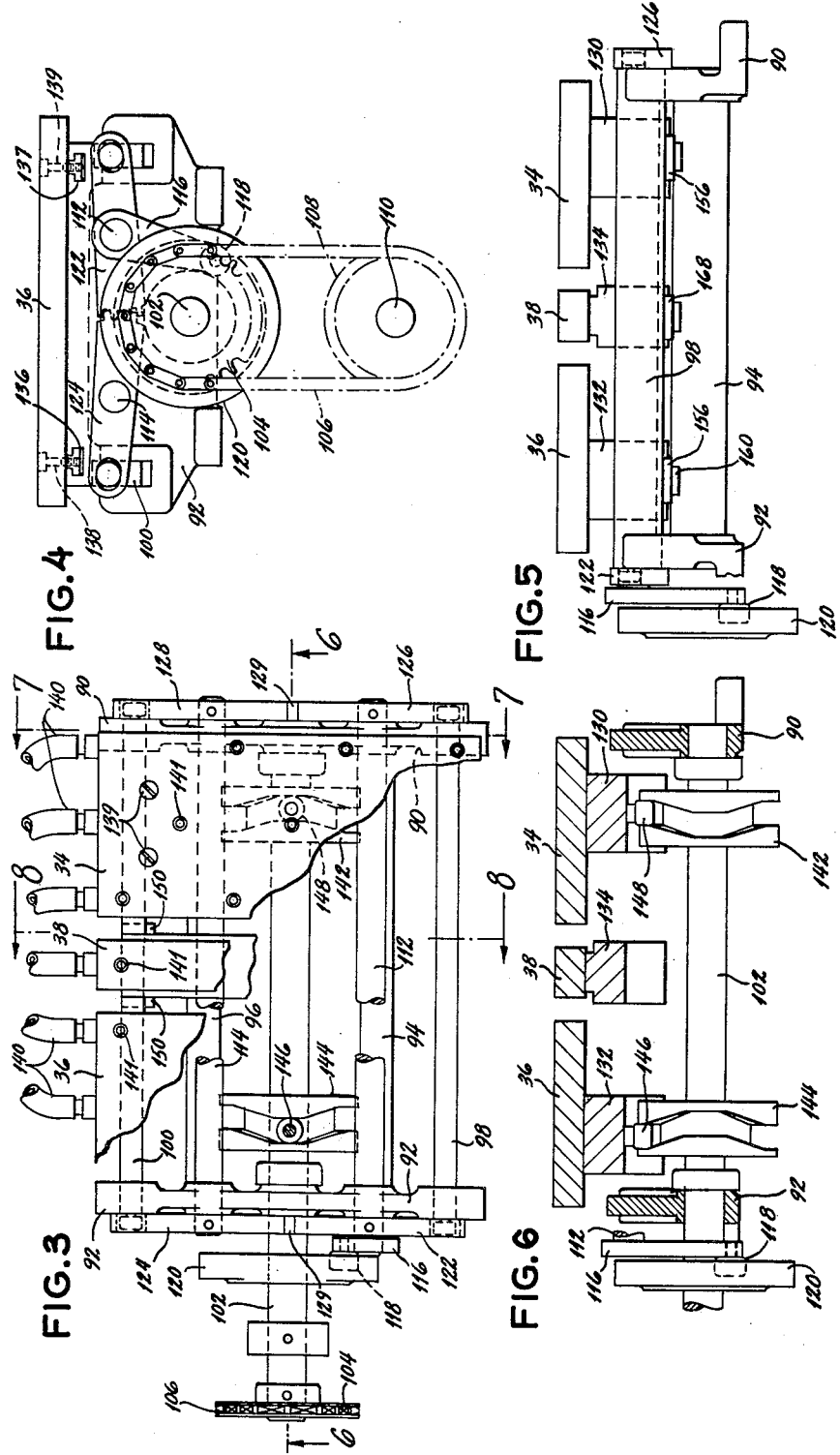

Dec. 18, 1962  J. O. McCAHON  3,068,501
APPARATUS FOR ASSEMBLING COMPONENTS OF CASES FOR BOOKS
Filed June 19, 1961  5 Sheets-Sheet 4

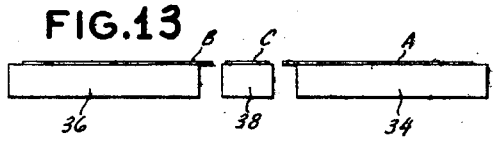
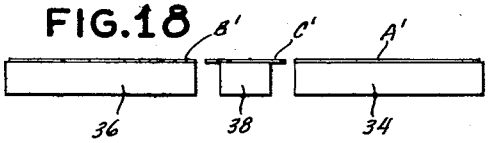
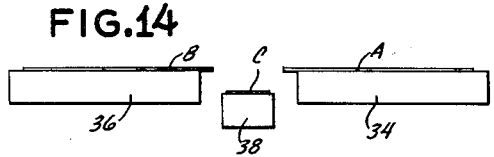
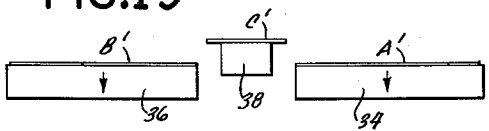
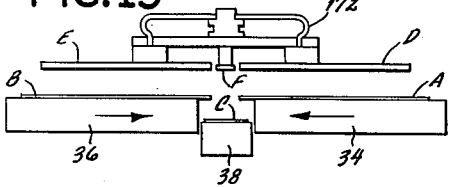
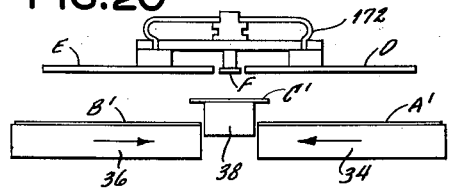
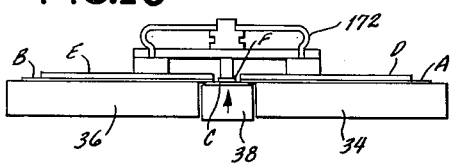
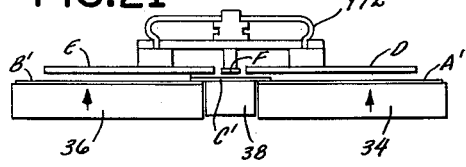
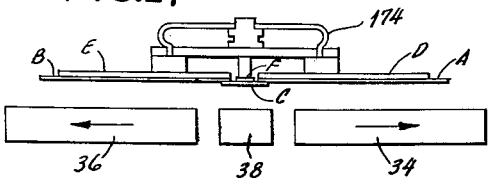
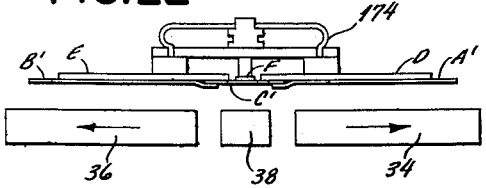
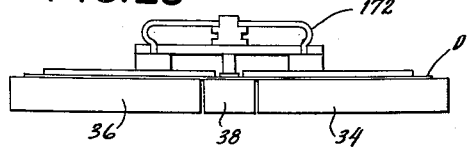
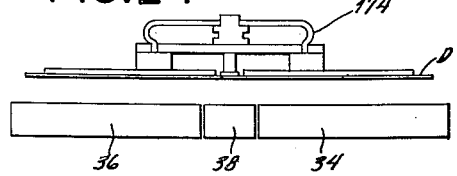

United States Patent Office 3,068,501
Patented Dec. 18, 1962

3,068,501
APPARATUS FOR ASSEMBLING COMPONENTS OF CASES FOR BOOKS
John O. McCahon, West Simsbury, Conn., assignor to The Smyth Manufacturing Company, Bloomfield, Conn., a corporation of Connecticut
Filed June 19, 1961, Ser. No. 118,129
18 Claims. (Cl. 11—2)

The invention relates to a machine for making casings for books and more particularly to a case making machine of the type shown in the Schramm Patent No. 2,925,612 dated February 23, 1960. In a machine as shown in the patent, the operation is cyclical and the parts of the casings are supplied at different stations and suitable devices are provided for engaging the parts or assemblies during each cycle and for transferring them successively from station to station. The present invention relates more particularly to a mechanism for assembling cover cloths with each other and with cover boards, such assembling being effected at stations II and III of the machine shown in the patent.

While the utility of an apparatus embodying the invention is not so limited, such an apparatus is primarily intended for making a book casing wherein there is a backstrip or center cover cloth, and wherein there are two side or main cover cloths which overlap the backstrip or center cloth at the edge portions thereof and are pasted thereto. The general object of the invention is to provide a simple and compact and effective apparatus for pasting and assembling the cover cloths at last above stated and for assembling them with cover boards.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 3 is a plan of the mechanism to which the invention more particularly relates, certain parts being broken away to show other parts more clearly.

FIG. 4 is a left end view of the mechanism shown in FIG. 3.

FIG. 5 is a front view of the mechanism shown in FIG. 3.

FIG. 6 is a vertical sectional view taken along the line 6—6 of FIG. 3, parts behind the plane of the section being omitted.

FIG. 13 is a schematic front view showing the platforms with cloths thereon.

FIG. 14 is a view similar to FIG. 13, but showing the center platform moved to its lower position.

FIG. 15 is a view similar to FIG. 14, but showing the end platforms moved toward the center platform and also showing a transfer device which has engaged cover boards and has transferred them to positions above the platforms.

FIG. 16 is a view generally similar to FIG. 15, but showing the center platform raised and showing the transfer device lowered to engage the cover boards with cloths on the platform.

FIG. 17 is a view somewhat similar to FIG. 16, but showing another transfer device which has separated the assembly of cover boards and cloths from the platforms, said platforms having been returned to their original positions as shown in FIG. 13.

FIG. 18 is a schematic front view generally similar to FIG. 13, but showing the platforms with different cloths thereon.

FIG. 19 is a view similar to FIG. 18, but showing the end platforms moved to lower positions.

FIG. 20 is a view similar to FIG. 19, but showing the end platforms moved toward the center platform and also showing a transfer device which has engaged cover boards and has transferred them to positions above the platforms.

FIG. 21 is a view generally similar to FIG. 20, but showing the end platforms raised and showing the transfer device lowered to engage the cover boards with the cloths on the platforms.

FIG. 22 is a view somewhat similar to FIG. 21, but showing another transfer device which has separated the assembly of cover boards and cloths from the platforms, said platforms having been returned to their original positions as shown in FIG. 18.

FIG. 23 is a view generally similar to FIG. 16, but showing a transfer device which has moved cover boards into engagement with a one-piece cover cloth on the platforms.

FIG. 24 is a view somewhat similar to FIG. 23, but showing another transfer device which has separated the assembly of cover boards and cloth from the platforms.

Figure 1:
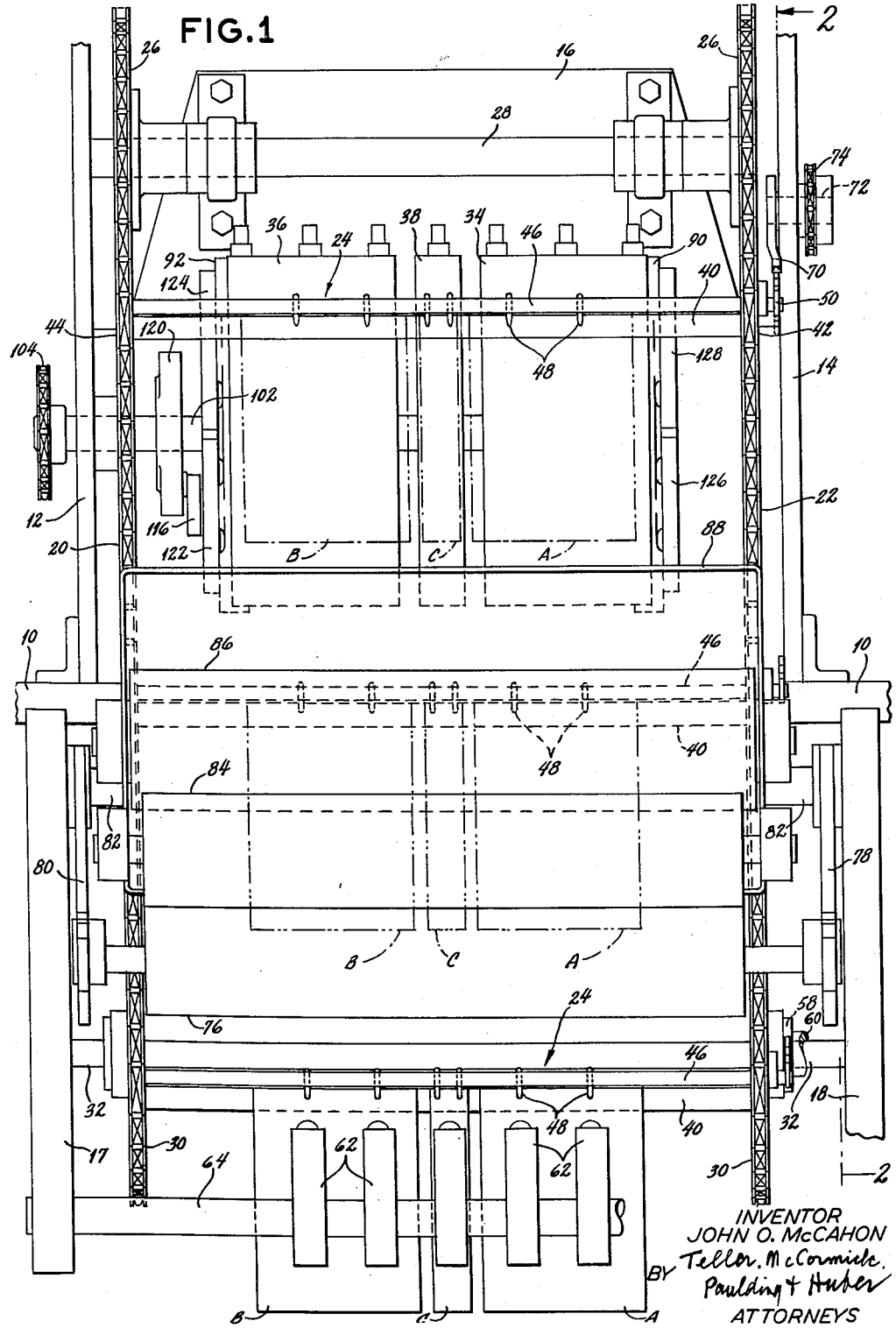
FIG. 1 is a plan view of a portion of a case making machine, this portion of the machine being an apparatus embodying the present invention.
Figure 2:
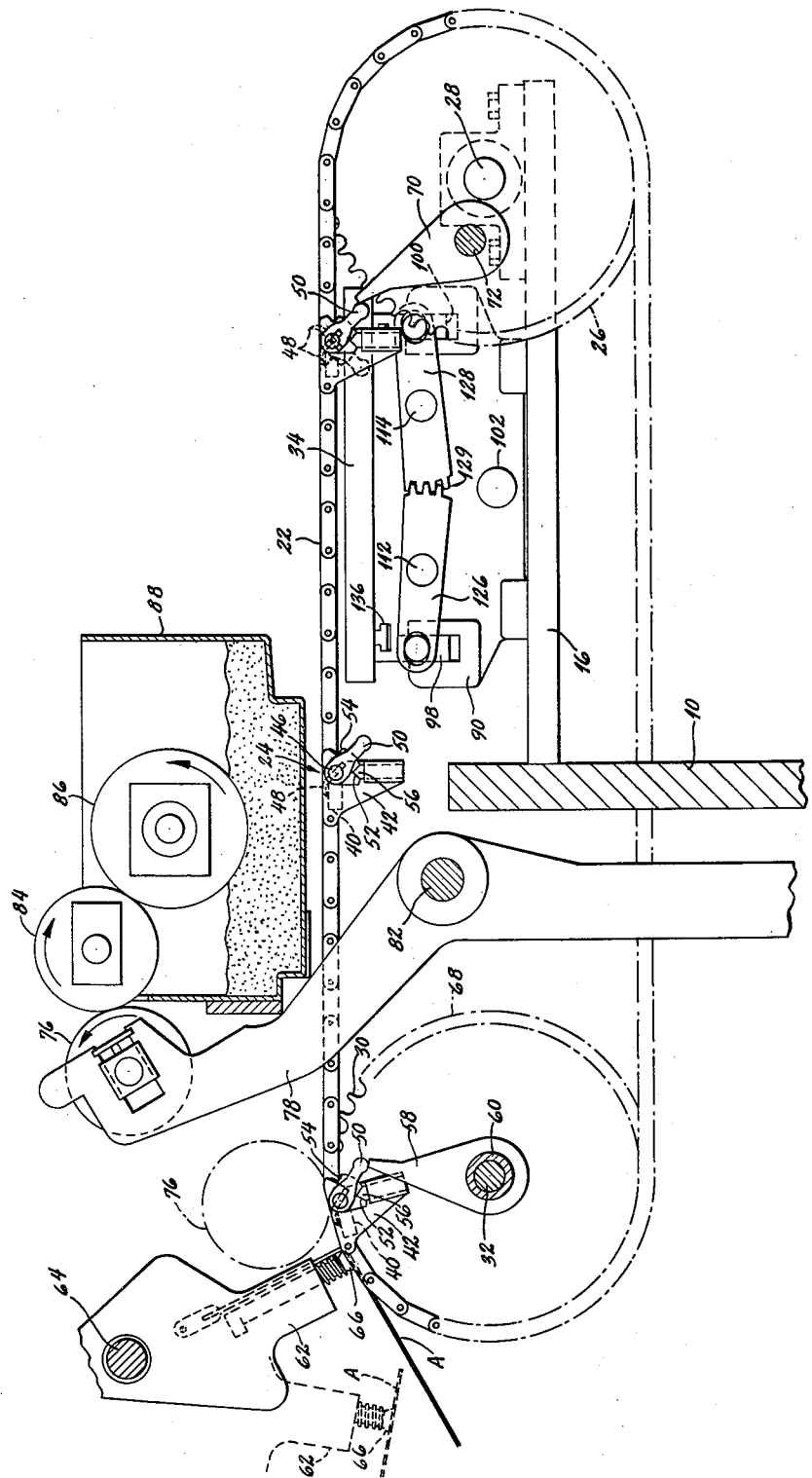
FIG. 2 is a fragmentary side and vertical sectional view of the apparatus shown in FIG. 1, this view being taken along the line 2—2 of FIG. 1 and also showing an additional part in section.

General Organization—FIGS. 1 and 2

FIGS. 1 and 2 of the drawings show the portions of the machine at a station which can be regarded as combining stations II and III of the machine as shown in the Schramm patent, this portion of the machine being the apparatus embodying the invention.

The main frame of the case making machine includes longitudinally extending front and rear vertical plates, only the front plate being shown at 10. Various cross members or plates extend transversely of the main frame plates, two of said transverse plates being shown at 12 and 14. For supporting certain parts associated with the present invention, there is provided a platform 16 at the rear of the plate 10. There is also an auxiliary frame at the front which includes transverse vertical plates 17 and 18.

At the front of the auxiliary frame, but not shown, are one or more stack mechanisms for holding suitable supplies of the cover cloths which are to form portions of the completed cases for books. Ordinarily each case comprises one backstrip or center cloth and two main cloths, and the stack mechanism or mechanisms are constructed and adjusted to hold such cloths. The center cloth C has a relatively small width in the longitudinal direction, that is, in the direction lengthwise of the machine. The two main cloths A and B are ordinarily wider than the center cloth. These above-mentioned stack mechanisms may be constructed and arranged as shown generally in said Schramm Patent No. 2,925,612 and as shown more specifically in the Schramm Patent No. 2,752,153 dated June 26, 1956, and entitled "Stack Mechanism for Book Components."

For moving cover cloths rearwardly, there are provided two transverse endless chains 20 and 22, together with gripper devices 24, 24 on the chains as hereinafter fully described. The chains are supported and guided at the rear by sprocket wheels 26, 26 secured to a longitudinal shaft 28 rotatable in bearings carried by the plate 16, and said chains are supported and guided at the front by sprocket wheels 30, 30 secured to a suitably supported longitudinal rotatable shaft 32 which is preferably tubular. A suitable means, not shown, is provided for rotating the shaft 32 intermittently and for thus actuating the chains 20, 22, the upper runs of the chains being moved rearwardly. The shaft 32 and the chains 20, 22 are actuated to move the gripper devices during each cycle of the machine through a distance equal to the spacing between each two adjacent gripper devices 24, 24. After each movement of the chains, the gripper devices are in the positions shown in FIGS. 1 and 2. The chains and the gripper devices 24, 24 during each rearward movement of the latter move a set of cover cloths A, B and C onto a horizontal platform structure which preferably comprises three separate platforms 34, 36, 38. Said platforms form parts of an assembly mechanism or unit which is hereinafter more fully described.

Each gripper device comprises a longitudinal bar 40 which is fixedly secured at its ends to special links 42 and 44 in the chains 20, 22. Also carried by the special chain links 42, 44 is a rockshaft 46 carrying gripper fingers 48, 48 adapted for cooperation with the bar 40 to grip the cover cloths. When there are three cover cloths such as A, B and C, there are preferably multiple gripper fingers spaced about as shown. The rockshaft preferably has additional holes, not shown, so that it is possible to readily change the spacing of the gripper fingers 48, 48 or to add additional gripper fingers as desired.

A lever 50 is secured to one end of the rockshaft 46, which may be the right end as shown in FIG. 1. The lever 50 has an extension with two notches 52 and 54 therein, and a spring detent 56 on the link 42 enters one or the other of the notches 52 and 54 to hold the lever 50 and shaft 46 and the fingers 48, 48 either in their operative position or in their inoperative positions.

For moving the gripper fingers from their inoperative positions to their operative positions, an arm 58 is secured to a sleeve 60 which is carried by and rotatable relatively to the tubular shaft 32. By suitable means, not shown, the sleeve 60 is turned in the clockwise direction and in timed relationship with the movement of the chains and of the gripper devices. While the corresponding gripper device is stationary, the arm 58 engages the lever 50, and said lever and also the shaft 46 and the gripper fingers 48, 48 are moved counterclockwise to enable the fingers to grip cover cloths. The detent 56 is then in the notch 52 and the gripper fingers are held in cloth engaging positions.

For transferring cover cloths from the before-mentioned stack mechanism or mechanisms at the front, there are provided suitable transfer dvices 62, 62. As shown, the transfer devices are secured to a rockshaft 64 which is oscillated cyclically and in timed relation to the movement of the chains and of the gripper units. Each transfer device includes a vacuum cup 66 which is engaged with a corresponding cover cloth A, B or C when said device is in its forward position. As the device swings rearwardly the corresponding cover cloth is removed from its stack mechanism and is moved rearwardly onto a cloth supporting cylinder 68 which is carried by the shaft 32 so as to be movable in unison with the sprocket wheels 30, 30. The cloths of each successive set are moved so that their rear edges are beneath the gripper fingers 48, 48 when said fingers are in their upper or inoperative positions. The rotation of the arm 58 is timed to engage the gripper fingers with the cloths immediately after the front edges thereof are entered beneath said grippers.

As before stated, the center cloth C has a relatively small width and the end cloths A and B are wider. Said cloths, when engaged by the grippers, must have their adjacent transverse edges closely adjacent, and this relationship is established in the stack mechanism or mechanisms and is maintained by the transfer devices 62, 62 and by the gripper devices 24, 24.

When the cover cloths A, B and C are over the corresponding platforms 34, 36, 38, they must be released by the corresponding gripper device 24. For releasing the gripper device there is provided an arm 70 secured to a longitudinal shaft 72, the shaft and arm being rotatable in the counterclockwise direction. The shaft 72 carries a sprocket wheel 74 engaged by a chain and the chain is actuated by means, not shown, to rotate the shaft and the arm so that said arm engages the arm 50 of the gripper device to rotate it in the clockwise direction for releasing the cloths A, B and C. The arm 70 engages the arm 50 while the corresponding gripper device is stationary, the position of the gripper device and the timing of the arm 70 being such that the cover cloths are released when they have been moved to their proper positions on the platform structure.

While not so shown, the levers 50, 58 and 70 and their associated parts may be duplicated at the left of the station. These duplicate parts have been omitted for simplification of illustration.

The stack mechanism or mechanisms and the transfer devices 62, 62 and the chains 20, 22 and the gripper devices 24, 24 collectively constitute means operable during each cycle for supplying a longitudinally narrow center cover cloth and two longitudinally wider main cover cloths and for transversely moving said cloths onto said platform structure or platforms with the inner transverse edges of the main cloths closely adjacent the outer transverse edges of the center cloth.

It is necessary that the cover cloths A, B and C be pasted on their upper faces before delivery thereof to the platform structure, that is, the platforms 34, 36, 38. For this purpose there is provided a pasting device which includes a roll 76 rotatable about a longitudinal axis and carried by arms 78 and 80 pivotally movable in unison, these arms being shown as carried by a longitudinal rockshaft 82. A mechanism, not shown, is provided for cyclically oscillating the shaft 82 and the arms 78 and 80 so as to move the roll 76 between forward positions shown by dotted lines in FIG. 2 and rearward positions shown by full lines. In its forward position, the roll 76 applies paste to the cover cloths on the cylinder 68 as they are moved rearwardly.

When the roll 76 is in its rearward position it engages a continually rotating roll 84 which in turn engages a continually rotating roll 86. The roll 86 dips into paste in a reservoir 88 and the rolls 86 and 84 apply paste to the roll 76 so that the surface thereof is covered preparatory to its subsequent engagement with the cover cloths.

*Cloth Assembling Mechanism—FIGS. 3 to 12*

The present invention relates more particularly to the mechanism for assembling the cover cloths A, B and C with each other, this mechanism including the before-mentioned platform structure.

In accordance with the broader aspects of the invention, a means is provided which is operable during each cycle and after the movement of the cloths A, B and C onto the platform structure for effecting relative movements of the cover cloths out of their initial positions so as to cause overlapping of the outer edge portions of the center cloth and the inner edge portions of the main cloths, with the result that said cover cloths are assembled with the pasted upper faces of the lowermost of said overlapping edge portions adhering to the lower faces of the uppermost of said overlapping edge portions. Preferably said means for effecting relative movements of the cloth is so constructed and arranged that said relative movements of the cloths include longitudinal movements of the main cloths toward each other to effect the overlapping relationship and further include relative vertical movements of the center and main cloths to effect engagement of the overlapping edge portions.

As before stated, the platform structure preferably includes separate platforms such as 34, 36, 38, and the beforementioned means for relatively moving the cover cloths to effect overlapping of their edge portions preferably includes said platforms and further includes devices for relatively moving the platforms and the cover cloths thereon. Said platforms and said devices for moving them constitutes an assembly mechanism which will now be described.

The assembly mechanism includes a "first" platform moving device operable during each cycle for effecting relative vertical reciprocatory movements between the center platform and the two end platforms, and also includes a "second" platform moving device operable during each cycle for moving the end platforms toward and away from said center platform. The relative vertical reciprocatory movement may be effected by vertically moving the center platform relatively to the end platforms or by vertically moving the end platforms relatively to the center platform.

Preferably the assembly mechanism is adapted for effecting either vertical reciprocation of the center platform or vertical reciprocation of the end platforms. To this end the mechanism includes a "first" platform connectible means held against vertical movement, a "second" platform connectible means, means for vertically reciprocating said second platform connectible means, and connecting devices each adapted for connecting a corresponding platform either with the first platform connectible means or with the second platform connectible means so that each platform is either held against vertical movement or is vertically reciprocated during each cycle.

The assembling mechanism, as shown, includes transverse end plates 90 and 92 which are held in fixed positions and which are secured to the horizontal supporting plate 16. Carried by the end plates 90 and 92 are pairs of longitudinal bars 94, 96 and 98, 100 which support the platforms 34, 36, 38. The bars of each pair are equally spaced from the longitudinal central plane of the mechanism. The bars 94, 96 are near the center of the mechanism and they are fixedly secured at their ends to the plates 90, 92. The bars 98, 100 are spaced forwardly and rearwardly from the bars 94, 96 and they are vertically movable in guide slots in said end plates 90, 92. The bars 94, 96 constitute the before-mentioned "first" platform connectible means, and the bars 98, 100 constitute the before-mentioned "second" platform connectible means.

A continually rotating longitudinal shaft 102 is provided, this being mounted in bearing apertures in the end plates 90, 92 and being located with its axis in said longitudinal central plane. The shaft carries a sprocket wheel 104 and it is driven by a chain 106 which passes around said sprocket wheel 104 and also around a sprocket wheel 108 on a longitudinal shaft 110. The shaft 110 is continually rotated by means, not shown, and it serves to effect one complete rotation of the shaft 102 during each cycle of the machine.

Two longitudinal rockshafts 112, 114 are provided these being mounted in bearing apertures in the end plates 90, 92 and being equally spaced from said longitudinal central plane. They are shown as being vertically above the bars 94, 96. Secured to one of the rockshafts, that is, the rockshaft 112, is a lever 116 which carries a cam roller 118 entered in a cam groove in a cam disc 120 secured to the shaft 102. The shape of the cam groove is such that the shaft 112 is oscillated and has one oscillation during each rotation of the shaft 102 and of the cam disc 120.

Secured to the rockshafts 112 and 114 are pairs of levers 122, 124 and 126, 128. The levers of each pair have gear segments 129, 129 at their inner portions which mesh with each other. Therefore when the shaft 112 is oscillated the other shaft 114 is similarly oscillated but in opposite directions. The levers 122, 124 and 126, 128 are slotted at their outer portions, and pins on the ends of the bars 98 and 100 enter and fit these slots. Therefore when the shafts 112, 114 are oscillated, the bars 98 and 100 are reciprocated upwardly and downwardly in unison having one complete reciprocation during each cycle. The levers 122, 124 and 126, 128 and the parts that operate them constitute the before-mentioned means for vertically reciprocating the said second platform connectible means, that is, the bars 98, 100. The bars 98, 100 and the levers 122, 124 and 126, 128 with their associated parts collectively constitute the before-mentioned "first" platform moving device.

Each of the platforms 34, 36, 38 is adapted to be supported either on the stationary bars 94, 96 or on the vertically movable bars 98, 100 as hereinafter more fully explained. Instead of being directly connectible with said bars, the platforms are preferably carried respectively by blocks 130, 132 and 134, and the platforms are connectible with the bars by means of said blocks. The blocks 130 and 132 and the platforms 34 and 36 thereon are also movable longitudinally along the bars 94, 96 and 98, 100 as also hereinafter more fully explained.

As shown in FIGS. 3 and 4, the supporting blocks 130, 132 and 134 have longitudinal T-slots 136 and 137 and the platforms are secured to the blocks by T-bolts 138, 139 entering said slots. The platforms 34 and 36 are longitudinally adjustable relatively to their respective blocks to meet the requirements of the particular book casing that is to be made. It is ordinarily not necessary to longitudinally adjust the center platform 38.

Preferably each platform is provided with vacuum means for holding the cover cloths in the positions at which they are deposited by the gripper devices 24, 24. As shown, each platform has one or more connections for hoses 140, 140 which communicate with a suitable vacuum pump, not shown. Holes 141, 141 are provided in the upper surfaces of the platforms and these holes are in communication with the corresponding hoses. By means of a suitable valve, not shown, the hoses 140, 140 and the holes 141, 141 can be connected with or disconnected from the vacuum pump so as to hold or release the cover cloths as required.

For effecting longitudinal movement of the blocks 130, 132 and of the platforms 34 and 36 thereon, two drum cams 142 and 144 are secured to the shaft 102, these cams being vertically below said blocks. Depending from the blocks are cam rollers 146 and 148 which enter and fit cam grooves in said cams. The cam grooves are so shaped that, during rotation of the shaft and the cams, the two blocks 130 and 132 are reciprocated in opposite directions and to uniform extents. There is one complete reciprocation during each cycle. The grooves in the cams are of sufficient depth to permit the before-mentioned vertical movements of the blocks 130 and 132 without in any way interfering with longitudinal movements. The cams 142 and 144 may be secured to the shaft 102 by set screws, not shown, and by loosening the set screws the cams may be adjusted longitudinally or rotatively for accurate timing of the motions imparted to the blocks 130, 132 and the platforms 34 and 36 thereon. The cams 142, 144 and the parts that operate them collectively constitute the before-mentioned "second" platform moving device.

The center block 134 is not movable longitudinally, it being held by pins 150, 150 on the bar 100 and preferably by similar pins, not shown, on the bar 98.

Figure 7:
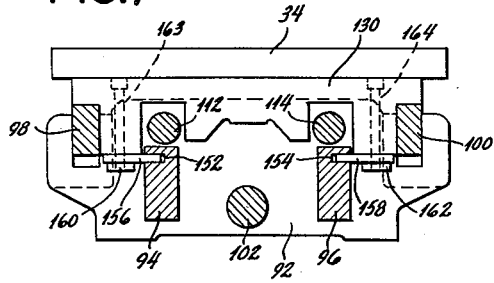
FIG. 7 is a vertical sectional view taken along the line 7—7 of FIG. 3, this view showing the end platform locked in its upper position.

FIG. 7 shows one of the end blocks, that is, the block 130, in its upper position and locked in said position. The stationary bars 94, 96 are provided with longitudinal grooves 152, 154 and the block 130 is provided with connectors 156, 158 which are held by nuts 160, 162 on vertical screws 163, 164. The connectors 156, 158 extend into and fit the grooves 152, 154 and they prevent any vertical movement of the block 130 or of the platform 34. The other end block 132 is similarly connected and repetition of the description is unnecessary. The connectors 156, 158 are freely movable longitudinally in the grooves 152, 158. Therefore the end platforms, although held to prevent vertical movement, are freely movable longitudinally by the cams 142, 144.

Figure 8:
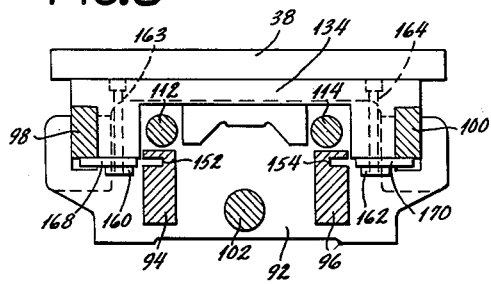
FIG. 8 is a vertical sectional view taken along the line 8—8 of FIG. 3, this view showing the center platform in its upper position and connected for vertical movement.

FIG. 8 shows the center block 134 in its upper position and it also shows the bars 98, 100 in their upper positions. The block 134 is connected to the bars by connectors 168 and 170 which are similar to the connectors 156, 158 and are similarly held. The tops of the bars 98, 100 directly engage the block 134, and the connectors 168, 170 engage the bottoms of the bars 98, 100. The block 134 and the platform 38 are therefore movable vertically in unison with the bars 98, 100.

Figure 9:
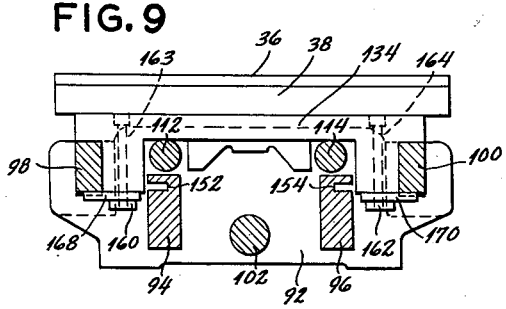
FIG. 9 is a view similar to FIG. 8, but showing the center platform in is lower position.

FIG. 9 is similar to FIG. 8, but it shows the bars 98, 100 and the block 134 and the platform 38 in their lower positions.

Figure 10:
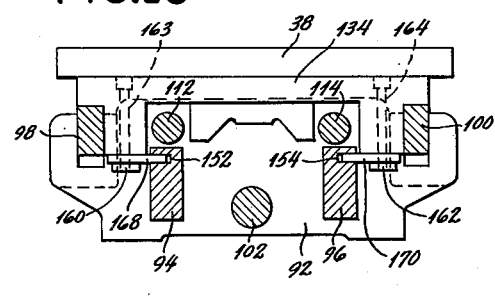
FIG. 10 is a view similar to FIG. 8, but showing the center platform locked in its upper position.

FIG. 10 is generally similar to FIG. 8 and it also shows the block 134 and the platform 38 in their upper positions. However, the connectors 168, 170 have been moved from the positions shown in FIG. 8 so that they are entered in the grooves 152, 154 in the stationary bars 94, 96. Thus the block 134 and the platform 38 are locked in their upper positions.

Figure 11:
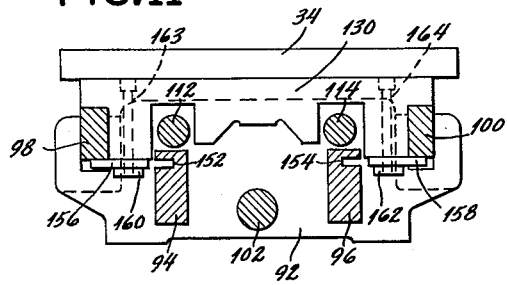
FIG. 11 is a view similar to FIG. 7, but showing the end platform in its upper position and connected for vertical movement.

FIG. 11 is generally similar to FIG. 7, and it also shows the block 130 and the platform 34 and the bars 98, 100 in their upper positions. However, the connectors 156, 158 have been moved from the positions shown in FIG. 7 so that they engage the bottoms of the bars 98, 100. Thus the block 130 is connected with the bars 98, 100, and said block and the platform 34 are movable vertically in unison with the bars. Although connected with the bars 98, 100, as described, the block 130 is free to be reciprocated longitudinally by the cam 142. It will be understood that the block 132 is similarly connected for vertical movement and is similarly free to be reciprocated longitudinally by the cam 144.

Figure 12:
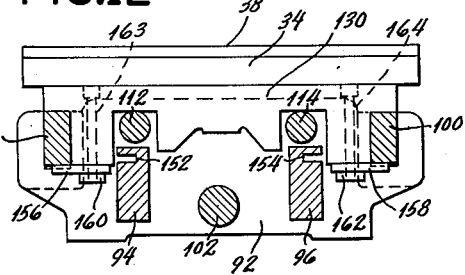
FIG. 12 is a view similar to FIG. 11, but showing the end platform in its lower position.

FIG. 12 is similar to FIG. 11, but it shows the bars 98, 100 and the block 130 and the platform 34 in their lower positions.

It will be observed that each of the connectors 156, 158 and 168, 170 is movable to either of two positions. Referring, for example, to the block 134 it will be apparent that the connectors 168, 170, when located in the positions shown in FIG. 8, connect the block with the vertically movable bars 98 and 100 so that the blade is moved vertically. When the connectors 168, 170 are located in the positions shown in FIG. 10, they connect the block with the stationary bars 94, 96 and vertical movement of the block 34 is prevented.

Expanation of Manner of Operation
FIGS. 13 to 24

FIGS. 13 to 17 schematically illustrate one manner of operation of the mechanism. This manner of operation is used when the center cover cloth C in the finished case is required to overlap the main cloths A and B at the outside of the case. The blocks and platforms are connected for operation as shown in FIGS. 7, 8 and 9, and the platforms are substantially spaced from each other as shown in FIGS. 2 and 13.

Center and main cloths of the proper widths and lengths are selected and the stack mechanism for applying the cover cloths to the transfer devices 62, 62 is adjusted to supply said cloths in the proper spaced relationship. Said spaced relationship of the cloths is maintained by the transfer devices and by the gripper devices, and the upper faces of the three cloths are pasted as they pass below the paste roller 76. The rearward movement of the cloths is continued and they are deposited on the platforms. Said center and main cloths are supplied and moved onto the platforms with the center cloth positioned on said center platform and with said main cloths respectively positioned on said end platforms with their inner transverse edge portions closely adjacent the outer transverse edge portions of the center cloth, said supplying means being so constructed and arranged that two of said cloth edge portions are substantially directly supported by the corresponding platform portions and that the other two cloth edge portions project longitudinally over the spaces between the platforms.

Specifically and as shown, the outer edge portions of the center cloth C are directly supported by the center platform 38 and the inner edge portions of the main cloths A and B project toward each other and beyond the platforms 34 and 36.

Immediately after the deposit of the cloths the first platform moving device, that is, the cam 120 and the parts operated thereby, acts to effect relative vertical reciprocatory movement, specifically to move the center platform 38 downwardly. As soon as the downward movement of the center platform 38 has started, the second platform moving device, that is, the cams 142 and 144, act to move the end platforms 34 and 36 toward each other and toward the platform 38 with the result that the projecting edge portions of the cloths A and B are in superposed relationship with the corresponding edge portions of the cloth C as shown in FIG. 15. The second platform moving device is so timed that said superposed relationship is maintained until said first platform moving device effects relative vertical platform movement to cause engagement between the lower faces of said projecting cloth edge portions and the upper pasted faces of said platform supported cloth edge portions so that said cover cloths are assembled with the pasted upper faces of the said edge portions adhering to the lower faces of said projecting cloth edge portions. Stated more specifically, as soon as the superposed relationship is established, the first platform 38 is moved upwardly to cause the pasted upper faces of the edge portions of the cloth C with the unpasted lower faces of the edge portions of the cloths A and B, the cloths then being in the assembled relationship shown in FIG. 16.

During the assembly of the cover cloths as described, cover boards D, E and F have been assembled at the first station of the machine which is at the left. A transfer device 172 engages the cover boards and moves them longitudinally toward the right to the position shown in FIG. 15, and then deposits them in the proper positions on the assembled cover cloths as shown in FIG. 16. The upper faces of the cloths have been pasted and the cloths therefore adhere to the boards.

As soon as the transfer device 172 has deposited the boards it returns toward the left, and a second transfer device 174 moves toward the left and engages the cover boards to lift the entire assembly of boards and cloths as shown in FIG. 17. As soon as the assembly has been lifted the platforms are returned to the FIG. 13 positions and another set of cloths is deposited upon them. The transfer device 174 moves toward the right to transfer the assembly for subsequent action which includes the folding of the cloths around the edges of the boards.

FIGS. 18 to 22 schematically illustrate another manner of operation of the mechanism. This manner of operation is used when the main cloths A' and B' in the finished case are required to overlap the center cloth C' at the outside of the case. The blocks and platforms are connected for operation as shown in FIGS. 10, 11 and 12, and the platforms are spaced from each other as shown.

Center and main cloths of the proper widths and lengths are selected and the stack mechanism for applying the cover cloths to the transfer devices 62, 62 is adjusted to supply the cloths in the proper spaced relationship. Said spaced relationship of the cloths is maintained as previously explained, and the cloths are pasted as they pass below the paste roller 76 and they are deposited on the platforms as shown in FIG. 18. The adjacent edges of the cloths A' and B' are substantially flush with the edges of the platforms 34 and 36 and the edges of the center cloth C' project beyond the edges of the platform 38.

Immediately after the deposit of the cloths, the cam 120 and the parts operated thereby act to move the end platforms 34 and 36 downwardly. As soon as the downward movement of the platforms 34 and 36 has started, the cams 142 and 144 act to move said platforms toward each other and toward the platform 38 with the result that the projecting edges of the center cloth C' overlie the corresponding edges of the end cloths A and B as shown in FIG. 20. As soon as the overlying relationship is established, the platforms 34 and 36 are moved upwardly to engage the pasted upper faces of the cloths A and B with the unpasted lower face of the cloth C, the cloths then being in the relationship shown in FIG. 21.

The steps as shown in FIGS. 21 and 22 are the same as described in connection with FIGS. 16 and 17 and repetition of the description is unnecessary.

When there is a single one-piece cover cloth D as shown in FIG. 23, the platforms 34, 36 and 38 are all held against vertical movement and in their upper positions. The platforms 34 and 36 are positioned immediately adjacent the platform 38, and the cams 142 and 144 are disconnected so that the last said platforms are not moved.

The cover cloth D is deposited on the platforms as shown in FIG. 23. Then the transfer device deposits the cover boards on the cloth D as also shown in FIG. 23. Thereafter the assembly of the cover boards and the cloth are removed and transferred as shown in FIG. 24.

The invention claimed is:

1. A cyclically operable apparatus for the assembly of components of cases for books, which apparatus comprises a horizontal platform structure adapted for supporting cover cloths, means operable during each cycle for supplying a longitudinally narrow center cover cloth and two main cover cloths and for transversely moving said cloths into initial positions on the said platform structure in which positions the inner transverse edges of the main cloths are closely adjacent the outer transverse edges of the center cloth, means for pasting the upper faces of said cloths prior to their movement onto said platform structure, and devices operable during each cycle and after the movement of the cloths onto said platform structure for effecting relative movements of the cover cloths out of said initial positions so as to cause overlapping of the outer edge portions of the center cloth and the inner edge portions of the main cloths with the result that said cover cloths are assembled with the pasted upper faces of the lowermost of said overlapping edge portions adhering to the lower faces of the uppermost of said overlapping edge portions.

2. A cyclically operable apparatus for the assembly of components of cases for books, which apparatus comprises a horizontal platform structure adapted for supporting cover cloths, means operable during each cycle for supplying a longitudnially narrow center cover cloth and two main cover cloths and for transversely moving said cloths into initial positions on the said platform structure in which positions the inner transverse edges of the main cloths are closely adjacent the outer transverse edges of the center cloth, means for pasting the upper faces of said cloths prior to their movement onto said platform structure, and devices operable during each cycle and after the movement of the cloths onto said platform structure for effecting relative vertical and longitudinal movements of the cover cloths out of said initial positions so as to cause overlapping of the outer edge portions of the center cloth and the inner edge portions of the main cloths, said devices being so constructed and arranged that said relative movements include longitudinal movements of the main cloths toward each other so that the inner edge portions of said main cloths are in superposed relationship with the outer edge portions of said center cloth and further include relative vertical movements of the cloths to bring said superposed edge portions into overlapping engagement with each other with the result that said cover cloths are assembled with the pasted upper faces of the lowermost of said overlapping edge portions adhering to the lower faces of the uppermost of said overlapping edge portions.

3. An apparatus as set forth in claim 1, wherein there is provided a transfer device which is operable during each cycle for engaging center and main cover boards in predetermined longitudinally spaced relationship with each other and for moving said cover boards longitudinally in a predetermined direction and downwardly onto said cover cloths after said cover cloths have been assembled with each other as described so as to form an assembly of said boards and cloths.

4. An apparatus as set forth in claim 3, wherein there is provided a second transfer device which is operable during each cycle for engaging the cover boards after deposit thereof by the first said transfer device and for then moving the assembly of said boards and cloths longitudinally and in the said predetermined direction.

5. A cyclically operable apparatus for the assembly of components of cases for books which apparatus comprises a horizontal center platform and two similar horizontal end platforms all arranged in a longitudinal row, the longitudinal width of the center platform being relatively small and substantial spaces being initially provided between the platforms, means operable during each cycle for supplying a longitudinally narrow center cover cloth and two main cover cloths and for transversely moving said cloths onto said platforms with the center cloth positioned on said center platform and with said main cloths respectively positioned on said end platforms with their inner transverse edges closely adjacent the outer transverse edges of the center cloth, means for pasting the upper faces of said cloths prior to their movement onto the platforms, a platform moving device operable during each cycle and after the movement of said cloths onto said platforms for effecting relative vertical reciprocatory movement between the center platform and the two end platforms, and a device operable during each cycle for longitudinally moving said main cover cloths toward each other while the center platform is in a relative position such that a center cloth on said center platform is out of longitudinal register with said end cloths with the result that said longitudinal movements of the main cloths bring the inner edge portions thereof into superposed relationship with the outer edge portions of said center cloth, said first platform moving device and said device for relatively moving the main cloths being so timed that said relative vertical movement of the platforms to bring said superposed edge portions of the cloths into overlapping engagement with each other so that said cover cloths are assembled with the pasted upper faces of the lowermost of said overlapping edge portions adhering to the lower faces of the uppermost of said edge portions.

6. A cyclically operable apparatus for the assembly of components of cases for books which apparatus comprises a horizontal center platform and two similar horizontal end platforms all arranged in a longitudinal row, the longitudinal width of the center platform being relatively small and substantial spaces being initially provided between the platforms, means operable during each cycle for supplying a longitudinally narrow center cover cloth and two main cover cloths and for transversely moving said cloths onto said platforms with the center cloth positioned on said center platform and with said main cloths respectively positioned on said end platforms with their inner transverse edge portions closely adjacent the outer transverse edge portions of the center cloth, said supplying means being so constructed and arranged that two of said cloth edge portions are substantially directly supported by corresponding platform portions and that the other two cloth edge portions project longitudinally over the spaces between the platforms, means for pasting the upper faces of said cloths prior to their movement onto said platforms, a first platform moving device operable during each cycle and after the movement of the cloths onto said platforms for effecting relative vertical reciprocatory movement between the center platform and the two end platforms, and a second platform moving device operable during each cycle for effecting longitudinal reciprocatory movements of said end platforms in opposite directions first toward said center platform and then back to their initial positions, said second platform moving device being timed to move the end platforms toward the center platform while cover cloths on the upper faces of said platforms are out of longitudinal register so that said projecting cloth edge portions are moved into superposed relationship with and above the platform supported cloth edge portions and said second platform moving device being further so timed that said superposed relationship is maintained until said first platform moving device effects relative vertical platform movement to cause engagement between the lower faces of said projecting cloth edge portions and the upper pasted faces of said platform supported cloth edge portions so that said cover cloths are assembled with the pasted upper faces of the said edge portions adhering to the lower faces of said projecting cloth edge portions.

7. An apparatus as set forth in claim 6, wherein the center and end platforms initially have their upper faces in longitudinal register with each other, and wherein the first platform moving device is timed to first relatively move the platforms first out of register with each other and then back into said register.

8. An apparatus as set forth in claim 7, wherein the center and end platforms are initially in their uppermost positions, and wherein said first platform moving device is timed so that the platform movement effected thereby is first downward and then upward.

9. An apparatus as set forth in claim 6, wherein said means for supplying cover cloths and for moving them onto said platform is constructed and arranged to supply and move a center cloth having a width approximately the same as that of the center platform and to supply and move closely spaced main cloths with the result that the inner edge portions of said main cloths project longitudinally over said spaces between the platforms.

10. An apparatus as set forth in claim 9, wherein said end platforms are held to prevent vertical movement, and wherein said first platform moving device is constructed and arranged to vertically reciprocate said center platform.

11. An apparatus as set forth in claim 6, wherein said means for supplying cover cloths and for moving them onto said platforms is constructed and arranged to supply and move a center cloth having a width substantially greater than that of the center platform with the result that the outer edge portions of said center cloth project longitudinally over the spaces between the platforms.

12. An apparatus as set forth in claim 11, wherein said center platform is held to prevent vertical movement, and wherein said first platform moving device means is constructed and arranged to vertically reciprocate said end platforms.

13. A mechanism for use as part of a cyclically operable apparatus for the assembly of components of cases for books which mechanism comprises: a horizontal center platform and two horizontal end platforms all arranged in a longitudinal row and in longitudinal register, the longitudinal width of the center platform being relatively small and substantially spaces being initially provided between said platforms, a first platform connectible means held against vertical movement, a second platform connectible means, means for vertically reciprocating said second means during each cycle, three connecting devices each adapted for connecting a corresponding platform either with the first platform connectible means or with the second platform connectible means so that each platform is either held against vertical movement or is vertically reciprocated during each cycle, and means operable during each cycle for effecting longitudinal movements of the end platform toward and away from the center platform.

14. A mechanism as set forth in claim 13, wherein the means for effecting longitudinal movements of the end platforms comprises two drum cams rotatable about a longitudinal axis and having cam grooves therein, and further comprises two cam followers connected respectively with the end platforms and entering the grooves in the cams, said grooves being of sufficient depth to permit the end platforms to be vertically reciprocated by said first platform connectible means while the followers remain in the grooves.

15. A mechanism as set forth in claim 13, wherein each connecting device is a single member having two alternative positions in one of which positions it engages the first platform connectible means and in the other of which positions it engages the second platform connectible means.

16. A mechanism as set forth in claim 13, wherein the first platform connectible means comprises two vertically movable longitudinal bars which are equally spaced from a central longitudinal vertical plane and which are held against vertical movement, wherein the second platform connectible means comprises two longitudinal bars which are equally spaced from said plane and are vertically reciprocable, and wherein each of the three connecting devices is adapted for connecting the corresponding platform either with the two bars of the first platform connectible means or with the two bars of the second platform connectible means.

17. A mechanism as set forth in claim 16, wherein the bars of the first platform connectible means have longitudinal grooves therein, and wherein each connecting device is adapted to be entered in a corresponding groove to hold the corresponding platform against vertical movement, said connecting devices for the end platforms being movable longitudinally in said grooves in accordance with the longitudinal movements of said end platforms.

18. A mechanism as set forth in claim 17, wherein each connecting device is a single member having two alternative positions in one of which positions it is entered in the groove of the corresponding bar of the first platform connectible means, and in the other of which positions it engages the corresponding bar of the second platform connectible means.

References Cited in the file of this patent

UNITED STATES PATENTS

| | | |
|---|---|---|
| 1,765,349 | Schramm et al. | June 17, 1930 |
| 2,516,602 | Snyder | July 25, 1950 |